United States Patent
Gollier

(10) Patent No.: US 8,130,433 B2
(45) Date of Patent: Mar. 6, 2012

(54) SPINNING OPTICS FOR SPECKLE MITIGATION IN LASER PROJECTION SYSTEMS

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 426 days.

(21) Appl. No.: 12/432,012

(22) Filed: Apr. 29, 2009

(65) Prior Publication Data

US 2010/0277705 A1   Nov. 4, 2010

(51) Int. Cl.
*G02B 26/08* (2006.01)
(52) U.S. Cl. .............. 359/201.2; 359/197.1; 359/201.1; 359/211.1; 359/17
(58) Field of Classification Search .............. 359/15–18, 359/201.1–203.1, 211.1–211.6, 196.1–197.1, 359/212.1–212.2, 223.1, 226.1–226.2; 353/37–38, 353/81
See application file for complete search history.

(56) References Cited

U.S. PATENT DOCUMENTS

| | | | | |
|---|---|---|---|---|
| 5,148,310 | A * | 9/1992 | Batchko | 359/479 |
| 5,307,207 | A | 4/1994 | Ichihara | 359/622 |
| 5,313,479 | A | 5/1994 | Florence | 372/26 |
| 5,621,529 | A | 4/1997 | Gordon et al. | 356/376 |
| 5,729,374 | A | 3/1998 | Tiszauer et al. | 359/212 |
| 6,081,381 | A | 6/2000 | Shalapenok et al. | 359/619 |
| 6,154,259 | A | 11/2000 | Hargis et al. | 348/756 |
| 6,317,169 | B1 | 11/2001 | Smith | 348/744 |
| 6,323,984 | B1 | 11/2001 | Trisnadi | 359/245 |
| 6,367,935 | B1 | 4/2002 | Wang et al. | 353/122 |
| H2045 | H | 9/2002 | Busse et al. | 385/31 |
| 6,445,487 | B1 | 9/2002 | Roddy et al. | 359/278 |
| 6,594,090 | B2 | 7/2003 | Kruschwitz et al. | 359/707 |
| 6,600,590 | B2 | 7/2003 | Roddy et al. | 359/287 |
| 6,738,105 | B1 | 5/2004 | Hannah et al. | 348/745 |
| 6,747,781 | B2 | 6/2004 | Trisnadi | 359/279 |
| 6,863,216 | B2 | 3/2005 | Tsikos et al. | 235/462.01 |
| 6,870,650 | B2 | 3/2005 | Kappel et al. | 359/15 |

(Continued)

FOREIGN PATENT DOCUMENTS

WO   97/02507   1/1997

(Continued)

OTHER PUBLICATIONS

Wang et al; "Speckle reduction in laser projections with ultrasonic waves"; Opt. Eng. 39(6) 1659-1664 (Jun. 2000); 2000 Society of Photo-Optical Instrumentation Engineers.

(Continued)

*Primary Examiner* — James Phan
(74) *Attorney, Agent, or Firm* — Svetlana Z. Short

(57) ABSTRACT

Particular embodiments relate generally to systems and methods of reducing the appearance of speckle in laser projection images. According to one embodiment, a laser projection system includes a light source, scanning optics and spinning optics. The light source includes at least one laser configured to emit an output beam. The scanning optics is positioned in an optical path of the output beam and configured to scan the output beam across a plurality of image pixels onto the spinning optics. The spinning optics is configured to create a virtual image of the scanning optics, translate the virtual image and change the angle of incidence of the output beam. The laser projection system is programmed to generate at least a portion of a scanned laser image, execute the translation of the virtual image by moving the spinning optics, and compensate for a relative image shift resulting from the translated virtual image.

17 Claims, 4 Drawing Sheets

U.S. PATENT DOCUMENTS

| | | | |
|---|---|---|---|
| 6,874,893 B2 | 4/2005 | Park | 353/84 |
| 6,910,774 B2 | 6/2005 | Troyer | 353/31 |
| 6,952,435 B2 | 10/2005 | Lai et al. | 372/9 |
| 7,046,446 B1 | 5/2006 | Kowarz et al. | 359/618 |
| 7,116,017 B2 | 10/2006 | Ji et al. | 310/23 |
| 7,119,936 B2 | 10/2006 | Kowarz et al. | 359/224 |
| 2006/0001780 A1 | 1/2006 | Ahn et al. | 348/744 |
| 2006/0028961 A1 | 2/2006 | Kim et al. | 369/112.01 |
| 2006/0109553 A1 | 5/2006 | Serafimovich et al. | 359/565 |
| 2006/0126184 A1 | 6/2006 | Kim et al. | 359/599 |
| 2006/0238743 A1 | 10/2006 | Lizotte et al. | 356/28.5 |
| 2006/0250532 A1 | 11/2006 | Shin | 349/6 |
| 2007/0047059 A1 | 3/2007 | Howard et al. | 359/277 |
| 2007/0153235 A1 | 7/2007 | Morikawa et al. | 353/20 |
| 2007/0296645 A1 | 12/2007 | Lee et al. | 345/6 |
| 2008/0239447 A1 | 10/2008 | Chen et al. | 359/226 |

FOREIGN PATENT DOCUMENTS

| | | |
|---|---|---|
| WO | 2005/041423 | 5/2005 |
| WO | 2005/062114 | 7/2005 |
| WO | 2005/083492 | 9/2005 |
| WO | 2005/098532 | 10/2005 |
| WO | 2006/024998 | 3/2006 |
| WO | 2006/137326 | 12/2006 |

OTHER PUBLICATIONS

Wang et al; "Speckle reduction in laser projection systems by diffractive optical elements"; Applied Optics; vol. 37; No. 10; Apr. 1, 1998; p. 1770-1775.

Kasazumi et al; "A practical laser projector with new illumination optics for reduction of speckle noise"; 2004 The Japan Society of Applied Physics; vol. 43, No. 8B, 2004; pp. 5904-5906.

Trisnadi; Hadamard speckle contrast reduction; 2004 Optical Society of America' Jan. 1, 2004, vol. 29, No. 1, Optics Letters; p. 11-13.

Trisnadi; "Speckle contrast reduction in laser projection displays"; Proceedings of SPIE; vol. 4657 (2002), p. 131-137.

Shin et al; "Removal of speckle using a computer generated random phase"; Proceedings of SPIE; vol. 6288; p. 1-7.

* cited by examiner

SPINNING OPTICS FOR SPECKLE MITIGATION IN LASER PROJECTION SYSTEMS

BACKGROUND OF THE INVENTION

1. Field of the Invention

Embodiments of the present disclosure relate to laser projection systems, and, more specifically, to laser projection systems that reduce the appearance of speckle that may be visible in a laser projection image.

2. Technical Background

Speckle may result whenever a coherent light source is used to illuminate a rough surface, for example, a screen, wall, or any other object that produces a diffused reflection or transmission. Particularly, a multitude of small areas of the screen or other reflecting objects scatter light into a multitude of reflected beams with different points of origination and different propagation directions. Speckle causes high spatial frequency noise in the projected image. At an observation point, for example in the observer's eye or at the sensor of a camera, these beams interfere constructively to form a bright spot, or destructively to form a dark spot, producing a random granular intensity pattern known as speckle. Speckle may be characterized by the grain size and contrast, usually defined as a ratio of standard deviation to mean light intensity in the observation plane. For a large enough illuminated area and a small enough individual scattering point size, the speckle will be "fully developed," with a brightness standard deviation of 100%. If an image is formed on the screen using a coherent light source such as laser beams, such granular structure will represent noise or a serious degradation of the image quality. This noise presents a significant problem, particularly when the projector is used to display high spatial frequency content, such as text.

A general concept of minimizing speckle contrast in an image consists of projecting an intermediate scanned laser image over a small sized diffusing surface, and using projection optics to project that intermediate scanned laser image toward the final projection surface. By rapidly moving the diffuser, the phase of the electric field is scrambled over time, which results in changing the perceived speckle pattern. If the diffuser is moving or vibrating fast enough, the perceived speckle pattern changes at high frequencies and are averaged in time by the eye. To reduce speckle efficiently, multiple speckle frames need to be created over the integration time of the eye, which is typically in the order of 50 Hz.

Although rapidly moving the diffuser provides speckle reduction, it requires an expensive and complicated mechanism to move the phase mask laterally at a relatively high speed. Further, a moving diffuser requires the use of auto-focus mechanisms as well as lenses possessing a high numerical aperture and a high field of view, which adds significant complexity and cost to the system.

BRIEF SUMMARY OF THE INVENTION

It is against this background that systems and methods of speckle reduction that do not require projection lenses and auto-focus mechanisms are desired.

According to one embodiment, a laser projection system including a light source, scanning optics and spinning optics is provided. The light source includes at least one laser configured to emit an output beam. The scanning optics is positioned in an optical path of the output beam and configured to scan the output beam across a plurality of image pixels through the spinning optics. The spinning optics is configured to create a virtual image of the scanning optics. The spinning optics are further configured to translate the virtual image and change the angle of incidence of the output beam. The laser projection system is programmed to generate at least a portion of a scanned laser image by operating the laser for optical emission of encoded image data and controlling the scanning optics. The laser projection system is also programmed to execute the translation of the virtual image by moving the spinning optics, and to compensate for a relative image shift resulting from the translated virtual image.

According to another embodiment, a method of operating a laser projection system comprising at least one laser is provided. The method includes generating a virtual image of an output beam of the at least one laser by operating the laser for optical emission of encoded image data and scanning the output beam across a plurality of image pixels. The method further includes rotating the virtual image of the output beam about an optical axis and projecting the virtual image of the output beam toward a projection surface.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Particular embodiments of the present disclosure may be described in the context of a laser projection system that is configured to scan an output signal or beam across a projection surface to generate a two dimensional image. The appearance of speckle in the scanned laser image may be reduced by changing the angle of incidence of the output beam upon the projection surface on a frame-per-frame basis. By changing the angle of incidence of the output beam, different speckle patterns are created because the light is scattered by the projection surface at different angles at each frame. The human eye or sensor then integrates and averages the different speckle patterns and the appearance of speckle is thereby reduced. Laser projection systems in accordance with the present disclosure do not require the use of moving diffusers, auto-focus mechanisms or high numerical aperture and field of view lenses, although these components may be utilized in conjunction with the embodiments described herein if desired. Embodiments may be implemented in not only laser projection systems, but other optical systems utilizing coherent light sources where the reduction of speckle is desired.

According to some embodiments, a virtual image of a scanned output beam is generated and rotated about an optical axis. The virtual image is then projected toward the projection surface so that it is viewable to an observer. Because the virtual image is rotating, each point of the image that is projected onto the projection surface is illuminated at a different angle of incidence, resulting in a laser image having reduced speckle content.

Figure 1:
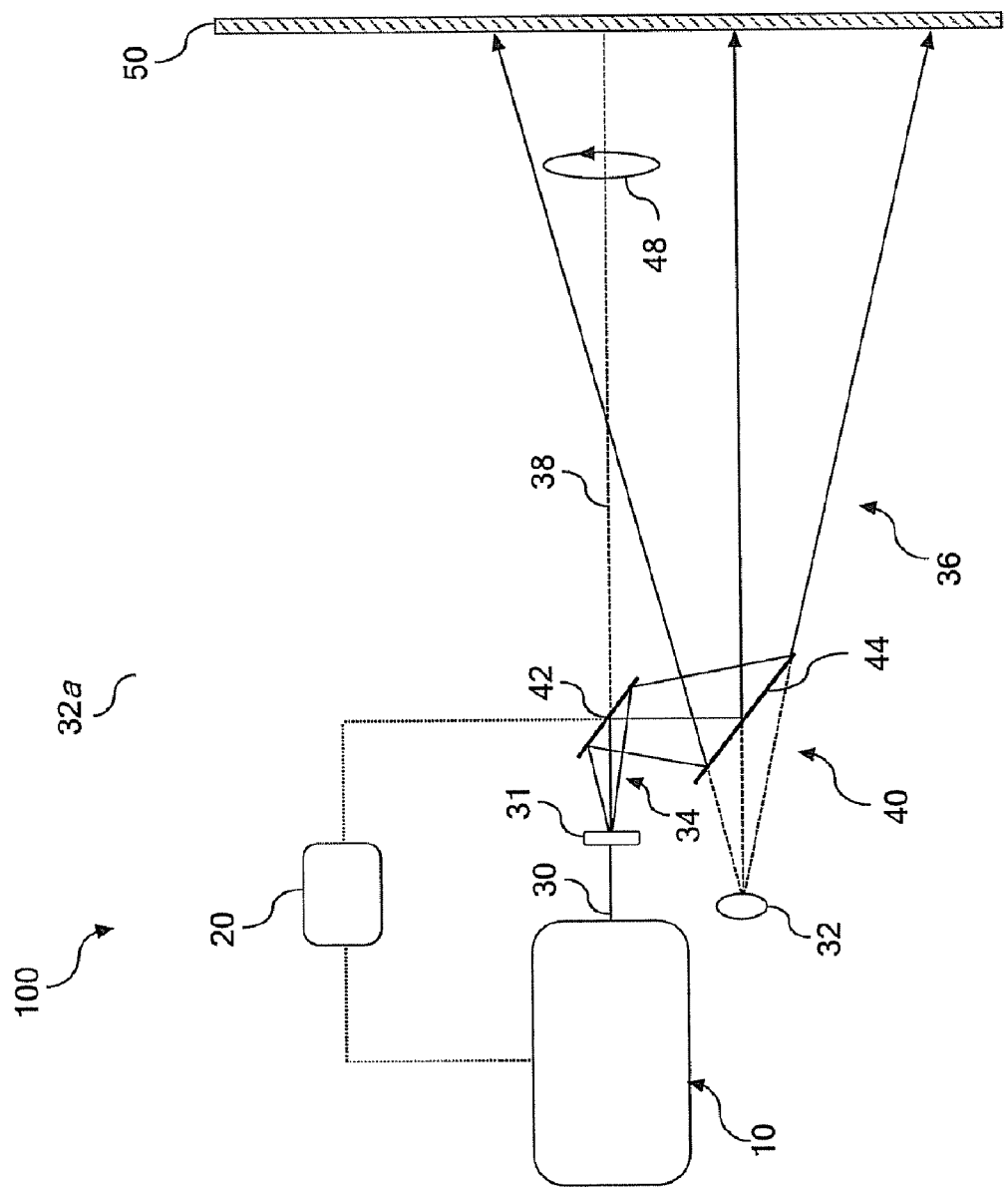
FIG. 1 is a schematic illustration of an exemplary laser projection system according to one or more embodiments.

FIG. 1 is a schematic illustration of an exemplary laser projection system 100 according to one or more embodiments. The exemplary laser projection system 100 is configured as a scanning laser projection system that two-dimensionally scans an output beam 30 generated by a light source 10 to create a two-dimensional image at a projection surface 50, such as a wall or a projector screen. The laser projection system 100 may be used to display static images (e.g., text), moving images (e.g., video) or both. The system may be a compact such that it may be incorporated into a relatively small device, such as hand-held projector, cell phone, personal data assistant, notebook computer or the other similar devices.

The light source 10 may comprise one or more lasers that are operable to emit laser beams at different wavelengths. For example, the light source 10 may comprise three lasers capable of emitting beams of red, blue and green wavelengths, respectively. In some embodiments, the output beam 30 consists of nearly collimated red, green and blue beams. Other embodiments may utilize a light source 10 that emits more or fewer collimated laser beams, and/or emit beams at wavelengths other than red, blue and green.

The light source 10 may comprise one or more single-wavelength lasers, such as distributed feedback (DFB) lasers, distributed Bragg reflector (DBR) lasers, vertical cavity surface-emitting lasers (VCSEL), vertical external cavity surface-emitting lasers (VECSEL) or Fabry-Perot lasers, for example. Additionally, to generate a green beam, the light source 10 of some embodiments may also comprise a wavelength conversion device such as a second harmonic generating (SHG) crystal or a higher harmonic generating crystal to frequency-double a laser beam having a native wavelength in the infrared band. For example, a SHG crystal, such as an MgO-doped periodically poled lithium niobate (PPLN) crystal, may be used to generate green light by converting the wavelength of a 1060 nm DBR or DFB laser to 530 nm. The light source 10 may also comprise lasers other than single wavelength lasers, such as lasers capable of emission of multiple wavelengths.

The laser projection system 100 may comprise a system controller 20, such as a microcontroller, and may be programmed to provide the light source 10 with one or more data signals that carry image data for projection in the laser projection system 100. To create the desired image, the light source 10 may emit the encoded image data in the form of gain or intensity variations of the output beam 30.

Scanning optics 31, such as an actuated mirror or prism as is known in the art, may be positioned in the optical path of the output beam 30 and be controllable to scan the output beam 30 in an x and y direction (e.g., a raster scan). The scanning optics 31 deviates angularly the output beam as a function of time such that the scanned output beam 34 hits the projection surface 50 at a position that changes over time.

The scanned output beam 34 is modulated in brightness to produce a plurality of beam spots or pixels on the projection surface 50 that are arranged across a plurality of lines that define a frame of the image. The scanned laser image is therefore composed of individual frames that are successively generated at an image frame rate (e.g., 50 Hz). Although the light source 10 and scanning element 31 are illustrated as effectuating a linear optical pathway, it is noted that other optical pathways are possible, such as non-linear or segmented optical pathways.

The scanning optics 31 may be configured and positioned to scan the output beam 30 onto spinning optics 40. The spinning optics 40 of the exemplary embodiment illustrated in FIG. 1 comprises first and second reflective surfaces 42 and 44. It is noted that other configurations of the spinning optics 34 are also possible, as discussed hereinbelow. The first and second reflective surfaces 42 and 44 may be folding mirrors, for example, or other, similar optical components. The first reflective surface 42 is positioned within the optical path of the scanned output beam 34 and angled to direct the scanned output beam 34 toward the second reflective surface 44. Both of the reflective surfaces 42 and 44 are of a size such that they are able to reflect an image provided by the scanned output beam 34. The second reflective surface 44 is angled and configured to redirect the scanned output beam 34 received from the first reflective surface 42 toward the projection surface 50 (i.e., redirected output beam 36).

The spinning optics 40 is configured to create a virtual image 32 of the scanning optics 31. As illustrated in FIG. 1, the exemplary first and second reflective surfaces 42 and 44 are arranged to create a virtual image 32 that is offset or shifted from an optical axis 38 by a distance that is determined by the separation between the first and second reflective surfaces 42 and 44. The virtual image 32 is positioned in a plane that is located behind the second reflective surface 42 relative to the projection surface 50 and should be translated at an amplitude that is sufficient to reduce the appearance of speckle in the scanned laser image (e.g., between about 3 mm and 10 mm). The consequence of inserting the spinning optics 40 into the optical path of the scanned output beam 34 is to shift the lateral position of the point from which the scanned beams 34 are originated since the beams originate from the virtual image 32 of the spinning optics 40 rather than from the scanning optics 31. Therefore, each pixel of the projection surface 50 is illuminated at an incidence angle that depends on the position of the scanning optics virtual image 32.

Figure 2:
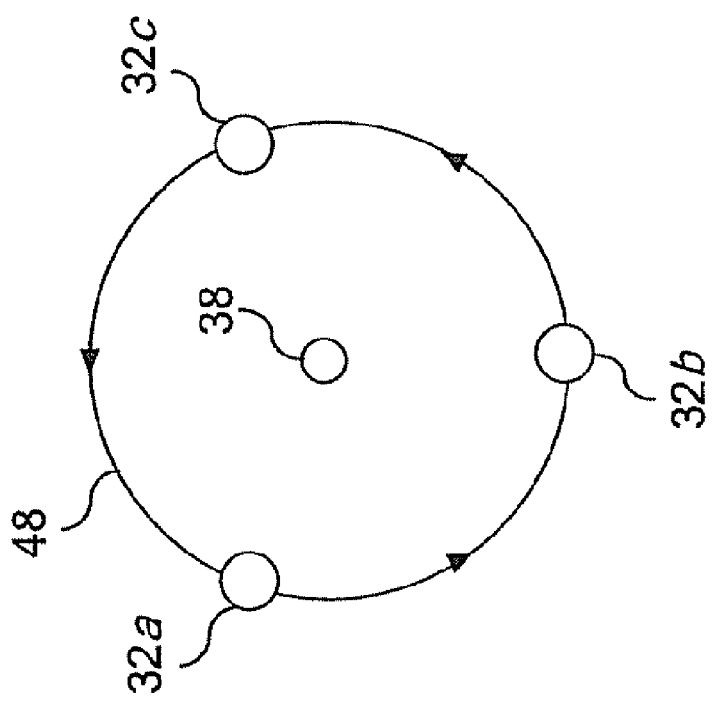
FIG. 2 is a schematic illustration of an exemplary virtual image rotating about an optical axis according to one or more embodiments.

As described hereinabove, the position of the virtual image 32 may be laterally translated by rotating the spinning optics 40 about an optical axis 38 of the projector as indicated by directional arrow 48. The spinning optics 40 may spin in a clockwise or counter-clockwise direction. The first and second reflective surfaces 42 and 44 may be attached to a structure that rotates the reflective surfaces 42 and 44 about the optical axis 38. The rotating structure may comprise any structure known in the art to rotate optical components. As the spinning optics 40 rotate, the virtual image 32 describes a circle 49 around the optical axis 38 as illustrated in FIG. 2. By controlling the spinning optics 40 to spin at a frequency that is less then the image frame rate, the virtual image 32 is projected onto the projection surface 50 from a different position and angle of incidence at each successive frame. Translating the virtual image 32 in this manner creates a different speckle pattern for each frame, thereby reducing the appearance of speckle to an observer. In other embodiments, the spinning optics may be configured to shift the virtual image laterally rather than provide a rotational motion.

FIG. 2 illustrates an exemplary virtual image 32 of the scanned output beam 34 at three difference frames as viewed from the projection surface 50 toward the light source 10. The virtual image 32 describes a circle 48 in a counter-clockwise direction around the optical axis 38. According to the exemplary embodiment illustrated in FIG. 1, the diameter of the circle 48 (i.e., the amplitude A of the virtual image 32 translation) is determined by the offset of the second reflective mirror 44 from the optical axis 38. A pixel of the virtual image 32 is projected toward the projection surface 50 from position 32a at a first frame. As the scanning optics 31 scan the output beam 30 across the remaining plurality of pixels and lines of the first frame, the spinning optics 40 continues to rotate the virtual image 32 about the optical axis 38. When the scanning optics 31 returns to the first pixel of the second frame, the spinning optics have rotated such that the pixel of the second frame now projects toward the projection surface 50 from position 32b. Similarly, at the third frame, the first pixel projects from position 32c. Finally, the spinning optics 31 returns to the original position of the first frame such that, at the fourth frame, the pixel of the virtual image projects from position 32a, and so on.

In this manner, each point of the image is illuminated at the projection surface 50 at a different angle of incidence on a frame-per-frame basis. According to the illustrated exemplary embodiment of FIG. 2, three different speckle patterns are rapidly generated at the projection surface 50 over the course of three frames. As described hereinabove, the eye averages these different speckle patterns so that the patterns are not noticeable to an observer.

Although FIG. 2 illustrates an embodiment in which the virtual image 32 is rotated at a frequency such that an individual pixel of the image is projected from three different positions, other embodiments may rotate the virtual image 32 at a frequency that provides for more or less than three positions. As an example, if the image frame rate is 50 Hz, the virtual image 32 may be made to rotate about the optical axis 38 at approximately 10 Hz. The spinning optics 31 should be controlled such that the virtual image 32 is projected from more than one position. The rotational motion of the spinning optics 40 may be controlled by the system controller 20, or it may be controlled by a separate controller or driver.

As a result of rotating the virtual image 32, the image projected onto the projection surface 50 may also visibly move or translate on a frame-per-frame basis, thereby introducing distortion and/or a relative image shift into the image. When the laser projection system 100 is at a distance from the projection surface 50 that causes lateral distortion or translation in the projected image, an image compensation method may be utilized to project an image that is substantially free from any distortion or translation. Image compensation methods shift the image to compensate for any lateral translation that is present in the projected image due to the rotating virtual image 32.

The position of an individual beam spot or pixel on the projection surface 50 as the virtual image 32 is rotated may be determined by:

$$P(t) = (D\tan(\theta(t)) + A\sin(\omega t), D\tan(\theta y(t) + A\cos(\omega t)), \quad (1),$$

where:
D is the distance of the light source 10 from the projection surface 50;
θx is the angle of the scanning optics 31 in the x direction;
θy is the angle of the scanning optics 31 in the y direction;
A is the amplitude of the virtual image 32 translation; and
ω is the rotational frequency of the spinning optics 40.

Equation (1) indicates that the position of an individual beam spot or pixel will move on the projection surface on a frame-per-frame basis as a result of the rotating virtual image 32 at the rotational frequency ω. The position of the beam spot is also dependent on the distance of the laser projection system to the project surface 50 and the amplitude A of the virtual image translation, which, according to some embodiments, is determined by the distance between a first and second reflective surface 42 and 44.

Some embodiments may utilize a compensation method that comprises providing a compensation signal to the scanning optics 31 such that the image translation caused by the spinning optics 40 is compensated. More particularly, the compensation signal may alter angles θx and θy of the scanning optics 31 to compensate for the image translation so that the image is corrected on the projection surface 50. By correcting the angles θx and θy of the scanning optics 31, a clear and stable image is presented to the viewer.

The amount of correction of the angle in the x-direction may be determined by:

$$D\tan(\theta_0 x(t)) = D\tan(\theta x(t)) + A\sin(\omega t), \quad (2),$$

where:
$\theta_0 x(t)$ is the angle of the scanning optics 31 if no image translation were present; and
$\theta x(t)$ is the angle of the scanning optics 31 that is needed to correct the image projected onto the projection surface 50.

The correction angle in the x-direction may be determined by solving for θx(t) such that:

$$\theta x(t) = \arctan\left(\frac{D\tan(\theta_0 x(t)) - A\sin(\omega t)}{D}\right), \quad (3).$$

Similarly, the correction angle in the y-direction may be determined by:

$$\theta y(t) = \arctan\left(\frac{D\tan(\theta_0 y(t)) - A\cos(\omega t)}{D}\right), \quad (4).$$

The above calculations may be performed by the system controller 20, which then may provide an appropriate correction signal to the scanning optics 31. The correction calculations depend on the distance D of the laser projection system 100 from the projection surface 50. Therefore, the distance D should be known or approximated to yield the most effective image compensation results. In some embodiments, the laser projection system 100 may also comprise a distance detection means such as those that are known in the art. Other embodiments may prompt a user to input an approximate distance D of the laser projection system 100 to the projection surface so that the correction signal may be determined.

The correction signal is also dependent on the angle of rotation ω of the spinning optics 40. Therefore, the angle of rotation ω should be monitored so that an accurate correction signal may be applied to the scanning optics 31. Some embodiments may use rotation encoders to monitor the angle of rotation ω of the spinning optics 40. The rotation encoders may provide the system controller 20 a signal that corresponds to an angular position of the spinning optics 40 as the spinning optics rotate about the optical axis. The system controller 20 may then use the signal provided by the rotation encoders to calculate the correction angles needed to compensate for any image distortion or translation.

Other embodiments may compensate for any distortion or image translation in the projected image by utilizing an image correction algorithm. The image correction algorithm, which may be performed by the system controller 20, corrects the image that is projected onto the projection surface 50 by altering the image data that is sent to the light source 10 according to the amount of image translation present in the projected image. Similar to the image compensation calculations provided hereinabove for adjusting the angle of the scanning optics 31, the image correction algorithm corrects for any relative image shift or distortion at given distance D. More particularly, the image correction algorithm shifts the image on a frame-per-frame basis so that the frames of the image correspond to a targeted image without distortion at the projection surface 50. As an illustration, if a pixel P1 is illuminated by a beam spot B1 during a first frame, but illuminated by a different beam spot B5 during the second frame as a result from the rotation of the virtual image 32, the image correction algorithm will change the image data provided to the light source 10 such that beam spot B5 corresponds to pixel P1 rather than pixel P5 during the second frame. Because the algorithm takes into account the distance D of the laser projection system 100 to the projection surface 50 and calculates the individual frames for any particular distance D, the system 100 does not require focus mechanisms, although such focus mechanisms may be utilized in some embodiments if desired.

Figure 3:
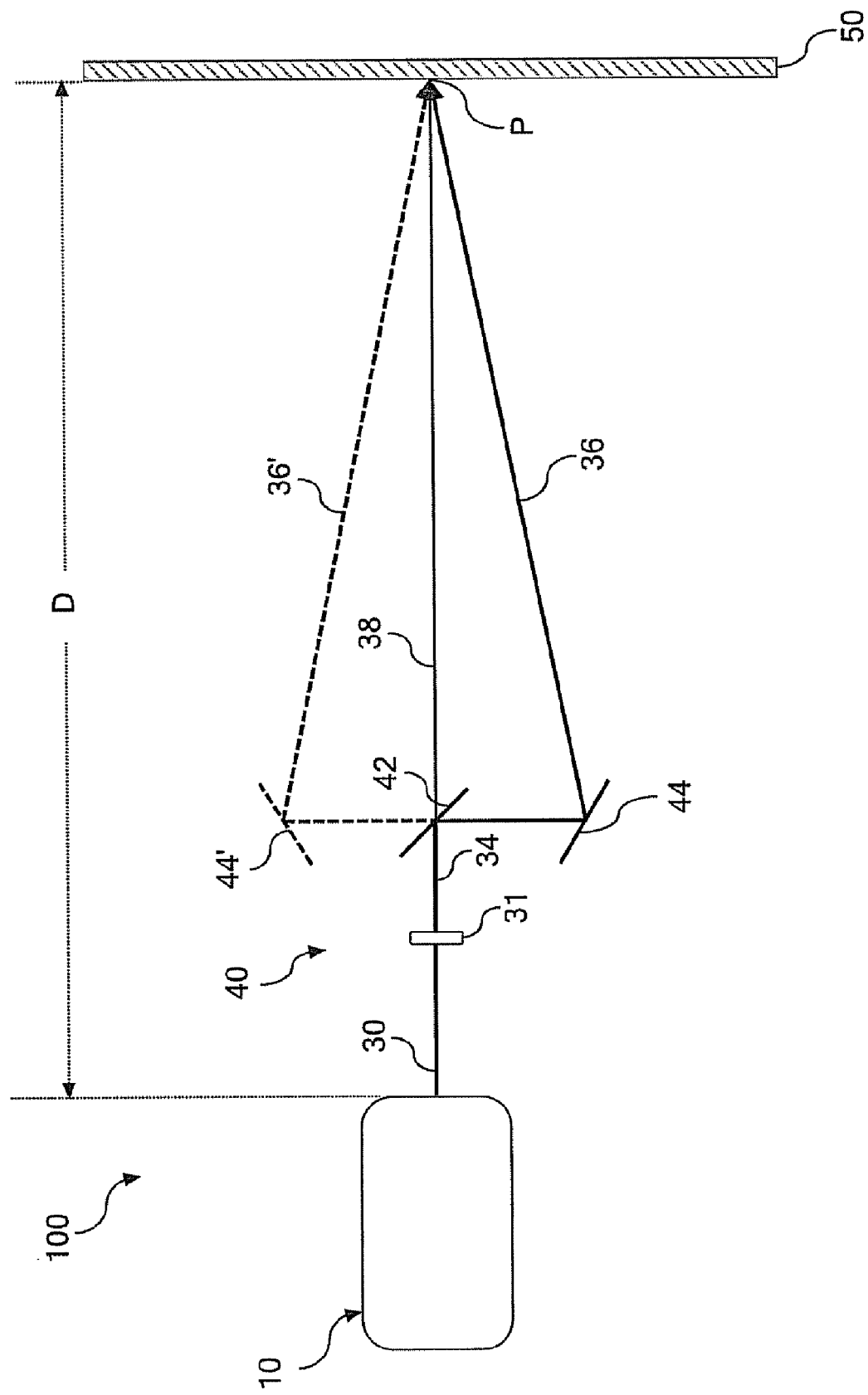
FIG. 3 is a schematic illustration of an exemplary virtual image rotating about an optical axis according to one or more embodiments.

The amount of image correction or compensation required may be minimized for a specific distance D from the projection surface 50, which decreases processing power requirements on the system 100 and increases projected image quality at the particular distance D. FIG. 3 illustrates an exemplary embodiment wherein the system 100 is configured to minimize the amplitude of correction at a particular distance D. The specific distance D may be a distance that is most common when using laser projection systems, for example.

In the illustrated embodiment, the angle of the first and second reflective surfaces 42 and 44 are calculated and positioned such that the output beam for the various positions of the rotating virtual image 32 all converge at the same point P on the projection surface 50 for a specific distance D. More particularly, the scanned output beam 34 representing a pixel or particular point of the virtual image 32 (FIG. 1) is redirected toward the projection surface at point P, as illustrated by redirected output beam 36. As the spinning optics 40 rotate, the second reflective surface 44 is moved to a new position illustrated as 44', which is approximately half-way around the circumference of the described circle (FIG. 2). As may be seen in FIG. 3, the angles of reflective surfaces 42 and 44 are such that redirected beam 36' converges at the same point P as redirected beam 36. Redirected beam 36' illuminates the same pixel or point of the virtual image 32 at the first position as the second position when the second reflective surface is located at the position indicated by 44'. Therefore, the projected image possesses minimal image translation or distortion because the pixels are illuminated at the same location for each frame. If the laser projection system 100 is moved closer to or further away from the projection surface 50, the redirected beams (e.g., 36 and 36') will not converge at the same point P, and image compensation methods described hereinabove may be utilized to correct the resulting distortion.

Figure 4:
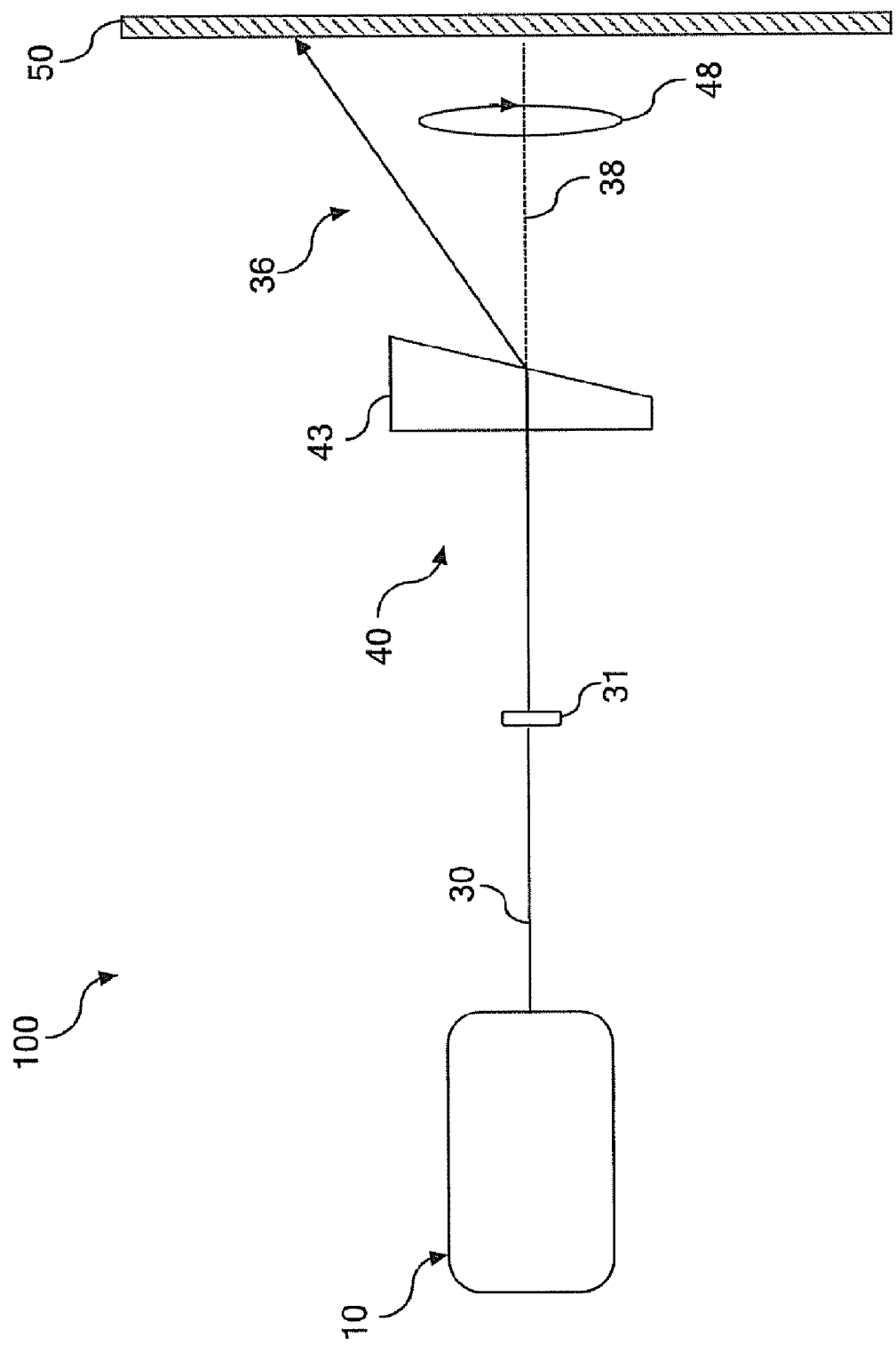
FIG. 4 is a schematic illustration of an exemplary laser projection system according to one or more embodiments.

The spinning optics 40 may be configured as any optical component or components that enable a virtual image to rotate about an optical axis and project that rotating virtual image onto the projection surface. As described hereinabove, by rotating the virtual image and illuminating the projection surface from changing angles of incidence, multiple speckle patterns may be generated on a frame-per-frame basis. FIG. 4 illustrates an exemplary laser projection system 100 in which the spinning optics 40 comprises a rotating element 43 positioned in the optical path of the scanned output beam 34 and is configured rotate the beam about an optical axis 38 toward the projection surface 50. The rotating element 43 may be a glass window with a wedge-shape exit face, or a holographic deflector, for example, and may be rotated by any rotating means known to those of ordinary skill in the art. An image compensation method may be used to correct for the resulting image translation or distortion, as described hereinabove.

For the purposes of describing and defining the embodiments disclosed herein, it is noted that the terms "approximately" and "substantially" are utilized to represent the inherent degree of uncertainty that may be attributed to any quantitative comparison, value, measurement, or other representation. The terms "approximately" and "substantially" are also utilized herein to represent the degree by which a quantitative representation may vary from a stated reference without resulting in a change in the basic function of the subject matter at issue.

It is noted that recitations herein of a component of the embodiments disclosed herein being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

It is also noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A laser projection system comprising a light source, scanning optics and spinning optics, wherein:
   the light source comprises at least one laser configured to emit an output beam;
   the scanning optics is positioned in an optical path of the output beam and configured to scan the output beam across a plurality of image pixels on a projection surface through the spinning optics;
   the spinning optics is configured to:
      create a virtual image of the scanning optics;
      translate the virtual image and change the angle of incidence of the output beam on the projection surface as the virtual image is translated; and
   the laser projection system is programmed to:
      generate at least a portion of a scanned laser image on the projection surface by operating the laser for optical emission of encoded image data and controlling the scanning optics to scan the output beam across the plurality of image pixels;

execute the translation of the virtual image by moving the spinning optics as the output beam is scanned across the plurality of image pixels on the projection surface; and compensate for a relative image shift resulting from the translated virtual image.

2. A laser projection system as claimed in claim 1 wherein the amplitude of the translation of the virtual image is between 3 mm and 10 mm.

3. A laser projection system as claimed in claim 1 wherein the translation of the virtual image comprises a rotation around a fixed point.

4. A laser projection system as claimed in claim 3 wherein:
the plurality of image pixels are scanned to define a plurality of image frames occurring at an image frame rate; and
the rotational frequency of the spinning optics is less than the image frame rate.

5. A laser projection system as claimed in claim 4 wherein the rotational frequency of the spinning optics is approximately twenty percent of the image frame rate.

6. A laser projection system as claimed in claim 1 wherein the laser projection system is further programmed to provide a compensation signal to the scanning optics to compensate for the relative image shift.

7. A laser projection system as claimed in claim 6 wherein the compensation signal is operable to compensate for the relative image shift at a plurality of projection distances.

8. A laser projection system as claimed in claim 6 wherein the compensation signal provides an adjusted scanning angle $\theta x(t)$ with respect to the x-axis and an adjusted scanning angle $\theta y(t)$ with respect to the y-axis.

9. A laser projection system as claimed in claim 1 wherein the laser projection system is further programmed to apply an image correction algorithm to the light source that modifies the optical emission of encoded image data such that the image is corrected in position and distortion at each frame according to the translation of the spinning optics.

10. A laser projection system as claimed in claim 9 wherein the compensation algorithm is operable to correct the image in position and distortion at a plurality of projection distances.

11. A laser projection system as claimed in claim 1 wherein:
the spinning optics comprises a first reflective surface and a second reflective surface;
the first reflective surface is positioned in the optical path of the scanned output beam and angled to directed the scanned output beam toward the second reflective surface; and
the second reflective surface is spatially separated from the first reflective surface and is angled to direct the scanned output beam toward the projection surface.

12. A laser projection system as claimed in claim 11 wherein the first and second reflective surfaces are angled such that a relative image shift resulting from the rotating virtual image is less at a predetermined distance D from the laser projection system to the projection surface than at distances other than D.

13. A laser projection system as claimed in claim 11 wherein the first and second reflective surfaces comprise folding mirrors.

14. A laser projection system as claimed in claim 1 wherein the spinning optics comprises a prism positioned within the optical path of the scanned laser beam.

15. A laser projection system as claimed in claim 13 wherein the prism comprises an output face that is angled relative to an input face.

16. A laser projection system as claimed in claim 1 wherein the spinning optics comprises a holographic deflector positioned within the optical path of the scanned laser beam.

17. A laser projection system as claimed in claim 1 wherein the laser projection system mounted in a cell phone.

* * * * *